United States Patent [19]

Ecker

[11] Patent Number: 5,602,426
[45] Date of Patent: Feb. 11, 1997

[54] AUTOMOTIVE THEFT-PREVENTION SYSTEM USING A KEY PAD AND A REMOTE SIGNALING MODULE

[76] Inventor: Ernest Ecker, 45 Washington St., Holliston, Mass. 01746

[21] Appl. No.: 445,253

[22] Filed: May 19, 1995

[51] Int. Cl.⁶ .................................................. B60R 25/00
[52] U.S. Cl. .................. 307/10.2; 180/287; 340/825.31; 340/825.72
[58] Field of Search ................... 307/10.1–10.6; 123/198 DB, 198 DC; 180/287, 289, 282; 340/425.5, 426, 542, 689, 825.31, 825.32, 825.34, 825.44, 825.69, 825.72; 361/171, 172

[56] References Cited

U.S. PATENT DOCUMENTS

| | | | |
|---|---|---|---|
| 4,689,603 | 8/1987 | Conigliaro et al. | 307/10.4 |
| 5,157,375 | 10/1992 | Drori | 340/426 |
| 5,276,728 | 1/1994 | Pagliaroli et al. | 307/10.5 |
| 5,382,948 | 1/1995 | Richmond | 307/825.31 |
| 5,481,253 | 1/1996 | Phelan et al. | 307/10.2 |

OTHER PUBLICATIONS

Insurance Policy Discount Form, The Commerce Insurance Company, 211 Main St, Webster, MA 01570, 3 pages Mar. 1991.

*Primary Examiner*—Richard T. Elms
*Attorney, Agent, or Firm*—Bromberg & Sunstein

[57] ABSTRACT

An anti-car-theft system incorporating solenoid locking devices and relays for disabling or locking a plurality of critical components of an automobile (such as the ignition, the steering, the brakes, the transmission and the hood), unless and until the system is deactivated by the entry of a security code into a control unit. To deactivate the system in a preferred embodiment, the owner first unlocks the driver's door by means of a keyless remote entry device. Once inside the automobile, the owner enters his or her security code into a keypad on the control unit, which is located inside the automobile. Upon proper entry of the security code, the system enables the car components previously disabled by the relays. After the proper entry of the security code, the system also allows the owner to enable the car components that had been locked by solenoids; these components may then be enabled by further action by the owner, such as, in a preferred embodiment, the unlocking of the passenger doors by the keyless remote entry device or by the passenger-door-unlock button on the inside of the driver's door.

2 Claims, 3 Drawing Sheets

5,602,426

AUTOMOTIVE THEFT-PREVENTION SYSTEM USING A KEY PAD AND A REMOTE SIGNALING MODULE

TECHNICAL FIELD

The present invention generally relates to theft prevention systems, and in particular, to motor vehicle theft prevention systems.

BACKGROUND ART

The number of motor vehicles being stolen and/or vandalized in recent years has been on the rise. As a result, the interest in motor vehicle security has greatly increased. This increased, in turn, has been followed by a rise in the availability of a wide range of anti-theft devices.

At present, there are several types of commercially available anti-theft devices for motor vehicles. One such type utilizes an audible alarm system to startle the prospective thief and/or to warn any by-standers of an impending theft. Such a system uses delicate motion sensors to activate a loud sounding alarm when an above threshold motion is detected or when the system is interrupted. An example of such a system is the popular siren sounding system. Another similar system not only sounds out a loud message indicating that the car is being stolen and the thief should be stopped, but also takes a picture of the prospective thief.

However, there is one significant disadvantage in using a system that utilizes an audible alarm. Specifically, if the vehicle is parked in an isolated area having little or no pedestrian traffic, the loud sounding alarm will in no way deter or prevent the prospective thief from getting into the motor vehicle, turning off the alarm, and driving away with the motor vehicle.

Another type of anti-theft device utilizes a locking mechanism within the interior of the vehicle. For instance, there is currently available a locking mechanism for the vehicle's steering column. Another locking mechanism locks both the vehicle's steering column and brake pedal. These locking mechanisms may prevent a prospective thief from driving away with the vehicle when properly engaged. However, these mechanisms are often bulky, making them difficult and time consuming to secure and disengage. Moreover, because of their size, these mechanisms are usually inconvenient to store once they have been removed. As a result, these locking mechanisms are not employed on a regular basis to secure the vehicle against possible theft.

Other types of anti-theft devices exist, such as fuel cut-off devices, ignition cutoff devices, armored cabled hood locks and hydraulic brake locks.

With anti-theft devices which provide only one or two levels or critical points of protection like those indicated above, only a relatively short period of time is usually needed by a prospective thief to disengage the protective device. Thus, even with an anti-theft system that, for example, shuts off the ignition of the vehicle, once the thief has learned how to compromise the system, there is nothing to prevent him from stealing the vehicle.

Accordingly, it is highly desirable to have available an anti-theft system that is easy and convenient to use, provides several levels or critical points of protection, be difficult to compromise, and prevents the prospective thief from driving away with the vehicle.

SUMMARY OF THE INVENTION

The device that is the subject of the present invention provides an electronic anti-theft system for complete security of a motor vehicle, for example an automobile. In one embodiment of the invention, the anti-theft system comprises a master control unit for activating and deactivating the system, a remote signaling module, a plurality of solenoid-actuated locking mechanisms, a plurality of disabling relay switches, and means for relaying a signal from the master control unit to the locking mechanisms and the relay switches. The master control unit includes, on its front surface, a digital key pad for entering a security code so as to activate and deactivate the system, and means for receiving a signal from the remote module. The remote signaling module includes a lock button and an unlock button which are also used for activating and deactivating the system. The solenoid-actuated locking mechanisms are situated at particularly critical components within the automobile, for instance, a steering column, shifter, hood, ignition, starter, fuel line, transmission, and brakes. Likewise, the relay switches may be linked to the ignition and the door locks. In this manner, when the system is activated, components linked to the relay switches and the locking mechanisms are rendered inoperable.

To activate the system, the lock button on the remote signaling module may be depressed to transmit an activation signal to the receiving means on the master control unit. Alternatively, prior to leaving the automobile, the ignition key may be removed and a security code may be entered via the digital key pad to transmit the activation signal. Once the activation signal is transmitted, each of the solenoid-actuated locking mechanisms is caused to move into an engaging position at its particular component (e.g. steering column, brakes etc.) thereby preventing the particular component from operating. Similarly, when each of the relay switches is activated, the component to which the relay switch is connected (e.g. ignition) is disabled. To this end, the automobile is substantially inoperable and immobilized, making it virtually impossible to be driven or towed away.

To deactivate the system, the unlock button on the remote module is depressed once to unlock the driver's door. Neither the passenger doors nor the solenoid-actuated locking mechanisms are disengaged with this initial depression. Once inside the automobile, the security code must be entered via the digital key pad on the master control unit to perform the initial deactivation of the system. Otherwise the anti-theft system will prevent the subsequent unlocking of the passenger doors and disengagement of the locking mechanisms. Once the system is initially deactivated, the unlock button on the remote module may be depressed for a second time to unlock the passenger doors. (Preferably the unlock button is depressed twice at this point to distinguish the signal from the initial depression.) Alternatively, the passenger doors may be unlocked manually by operating the door locks. When the passenger doors are unlocked, each solenoid-actuated locking mechanism and each relay switch is consequently disengaged from its particular component thereby making the automobile readily operable.

DETAILED DESCRIPTION OF SPECIFIC EMBODIMENTS

Figure 1:
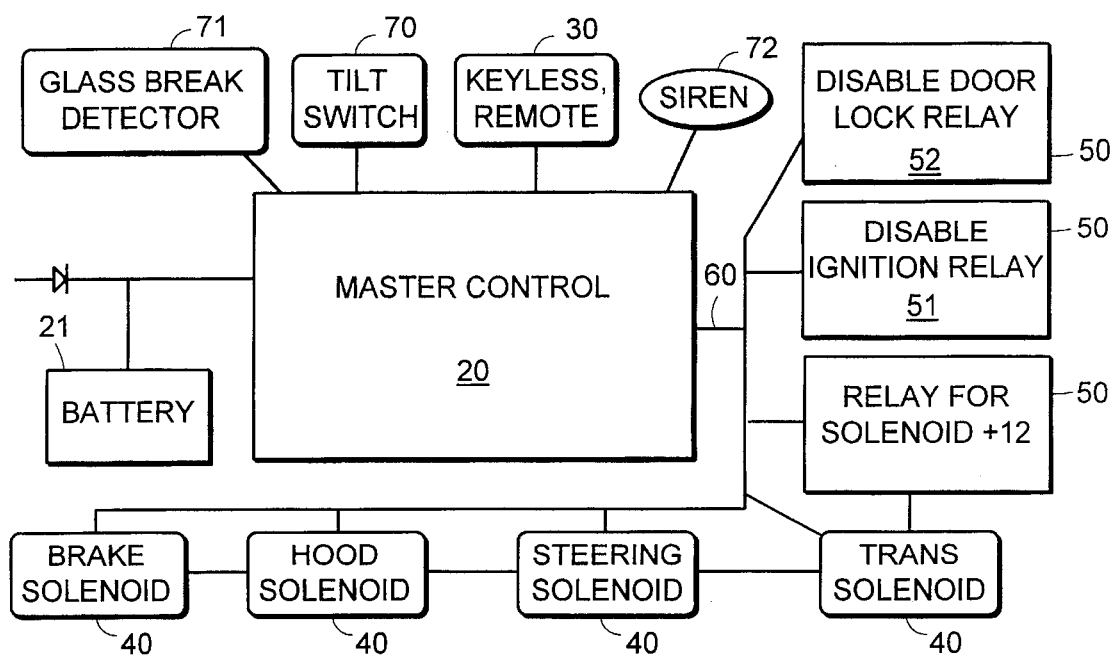
FIG. 1 is a block diagram of the anti-theft system according to one embodiment of the prevention.

FIG. 1 illustrates one embodiment of an anti-theft system in accordance with the present invention. The system is an electronic anti-theft system which may provide complete security for a motor vehicle. The system comprises a master control unit 20, a receiver 30 for detecting signals from a remote signaling module (such as that shown in FIG. 4), a plurality of solenoid-actuated locking mechanisms 40, a plurality of disabling relay switches 50, and means 60 for carrying a signal from the master control unit 20 to the locking mechanisms 40 and the relay switches 50.

Figure 2:
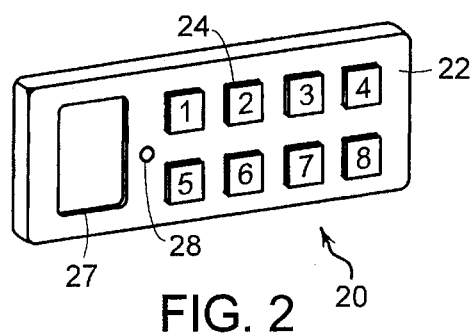
FIG. 2 is a perspective view a master control unit for the anti-theft system illustrated in FIG. 1.
Figure 3:
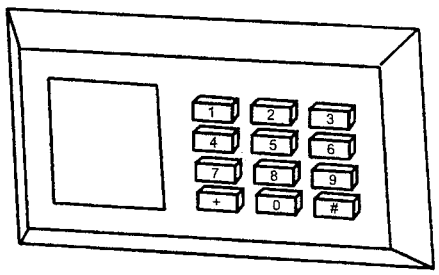
FIG. 3 is a perspective view of an alternate embodiment of the master control unit illustrated in FIG. 2.

The system is activated by way of master control unit 20 and receives its power by way of the automobile battery linked to the master control unit 20. If it is desired, master control unit 20 may be manufactured to accommodate a small back-up battery 21 in the event the automobile battery fails to operate or is somehow disabled by an attempted thief. Looking now at FIG. 2, master control unit 20, which may be mounted on a dashboard of a motor vehicle for easy access and operation, includes a front surface 22 on which a digital key pad 24 is situated. The key pad 24, provides one preferred mode for activating the anti-theft system. Specifically, a security code may be entered using the key pad 24. The present invention may be provided with a light 28 on the front surface 22 of master control unit 20, to verify, once the security code has been entered, that the system is fully activated. Light 28 is preferably a bright light so that it may be easily sighted by by-passers. In one embodiment, a steady light indicates the system is armed, and a blinking light indicates that in the owner's absence an attempted break-in of the vehicle occurred. Key pad 24, in addition, provides the only mode for which the anti-theft system may be completely deactivated (see discussion below). A speaker 27 may be included in the control unit to emit beeps or other sounds for indicating to the user the proper or improper entry of a security code, the proper activation of the system, etc. Preferably, a separate high-output siren 72 is used to signal an attempted theft or break-in.

Master control unit 20 may be manufactured by well known methods in the art, and may be made out of any strong material, for instance, metal or molded plastic. Similarly, the digital key pad 24 may be made from molded plastic. Control units used for many home security systems may be easily adapted to perform the function of the master control unit 20.

Figure 4:
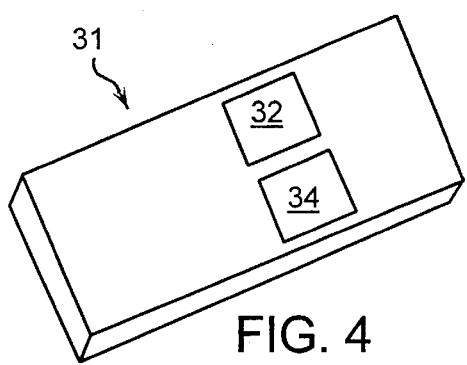
FIG. 4 is a perspective view of a remote signaling module for the anti-theft system illustrated in FIG. 1.

The system also includes remote signaling module 31. As illustrated in FIG. 4, remote module 31 includes on its top surface an activation button 32 and a deactivation button 34. Although buttons 32 and 34 are shown adjacent to one another, the relative position of buttons 32 and 34 may be anywhere on remote module 31. Activation button 32, when depressed, causes the transmission of an activation signal to signal-receiving means 30 so as to completely activate the system. Conversely, when the deactivation button 34 is depressed, the signal from transmitter 31 does not completely deactivate the system. A three-step process, as is explained hereinafter in detail, must be followed in order to completely deactivate the system.

Signaling module 31, like master control unit 20, may be manufactured by well known methods in the art, and may be made from any strong material, for example, molded plastic. Remote modules presently used for activating and deactivating car alarms and for keyless remote unlocking of car doors may be easily adapted to work in the present invention. Similarly, an aftermarket version of the embodiment of the invention described herein preferably uses as much of the car's original wiring as possible.

Referring again to FIG. 1, a plurality of solenoid-actuated locking mechanisms 40 is provided for the system so that locking mechanisms 40 may be situated at several critical components throughout the motor vehicle. A component is considered critical if, by the engagement of the locking mechanism 40 installed thereat, the component is locked and prevented from properly operating. In a preferred embodiment, a locking mechanism 40 may be installed at each of a steering column, shifter, hood, ignition, starter, fuel line, transmission, and brakes. Thus, for example, if the locking mechanism 40 at the steering column is engaged, the vehicle is no longer capable of being turned. Likewise, an engaged locking mechanism 40 at the hood prevents the hood from being opened.

The anti-theft system also includes a plurality of disabling relay switches 50 linked to particular components of the motor vehicle. In a preferred embodiment of the present invention, one relay switch 51 is linked to the vehicle's ignition while another relay switch 52 is linked to the passenger door locks. To this end, when the system is activated, not only will the above-mentioned critical components linked to locking mechanisms 40 become inoperable, but the ignition linked to the relay switch 50 is also disabled to prevent the automobile from starting. If a situation arises whereby additional locking mechanisms 40 and/or additional relay switches 50 are needed, the system is preferably designed to accommodate for such an addition by simply allowing more relay switches 50 or solenoid-actuated locking mechanisms 40 to be added.

The system also includes means 60 for carrying a signal from the master control unit 20 to the locking mechanisms 40 and the relay switches 50. Carrying means 60 are preferably electrical wires extending from the master control unit 20, and connecting each of the relay switches 50 and each of the locking mechanisms 40. In this manner, when the system is activated via master control unit 20, all locking mechanisms 40 and all relay switches 50 may be properly actuated. More importantly, as is hereinafter discussed, the manner in which the locking mechanisms 40 are connected to relay switches 50 by carrying means 60 allows for the disengagement of all locking mechanisms 40 when a relay switch 50 at a passenger door lock is inactivated.

Figure 5:
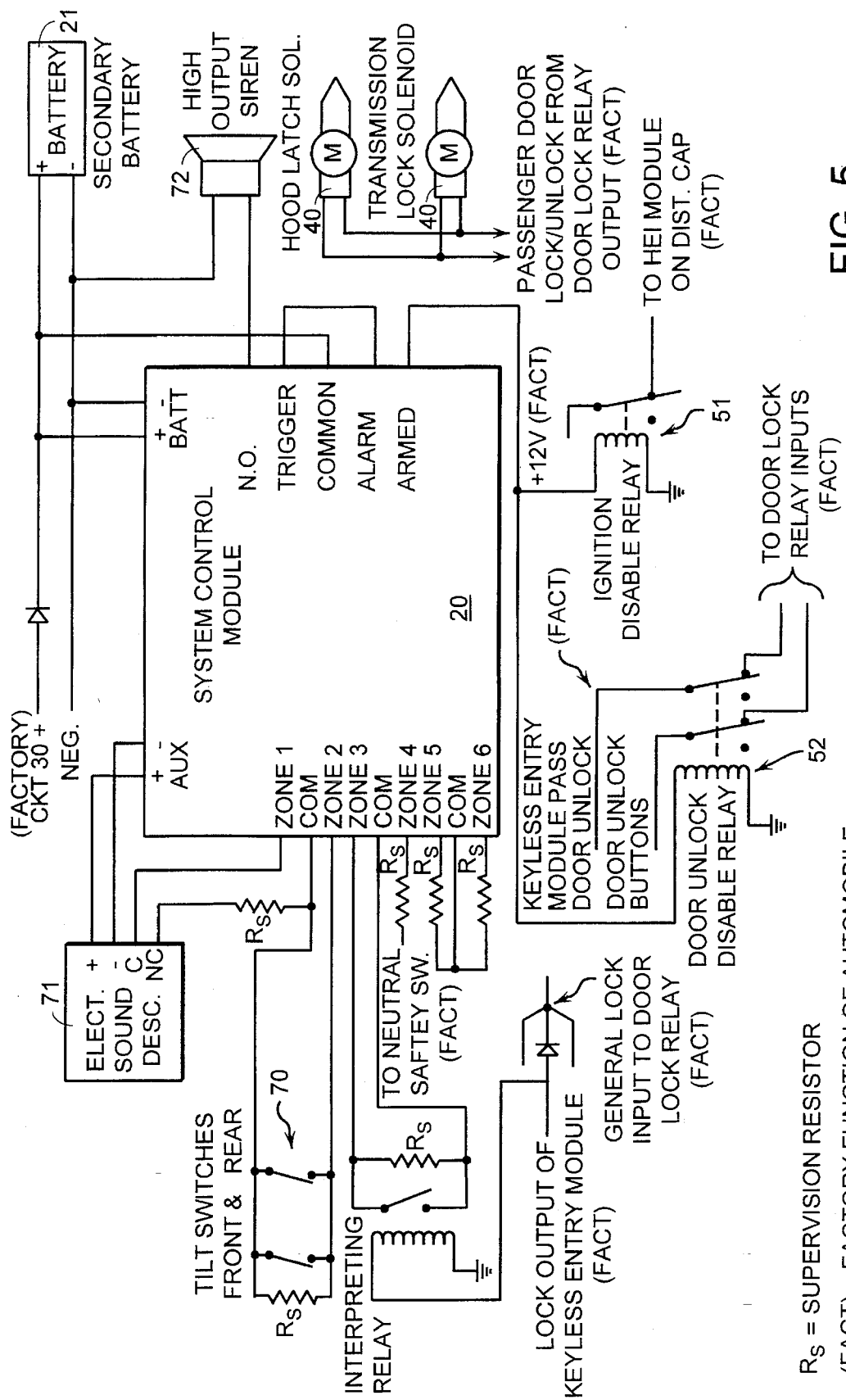
FIG. 5 illustrates a wiring system for an embodiment of the present invention.

A preferred wiring scheme for the invention is depicted in FIG. 5. As shown in both FIGS. 1 and 5, the anti-theft system 50 of the present invention may further include delicate motion-sensing devices 70, a glass-break detector 71 and an audible alarm 72 linked to master control unit 20. The system is designed so that it is capable of activating the siren 72 if an above-threshold motion is detected by the motion-sensing devices 70 such as when the vehicle is tilted, if the sound of breaking glass is detected by sensor 71, or if the system is interrupted. The siren may use a recorded human voice to announce that the car is in the process of being stolen.

To activate the system, prior to leaving the automobile, the ignition key may be removed and, as indicated above, a security code may be entered via the digital key pad 24 to transmit an activation signal via the relaying means 60 to each of the solenoid-actuated locking mechanisms 40 and disabling relay switches 50. (Even if the ignition key is not removed and even if a door is left open, the system can still be activated, so that someone entering the unlocked car will not be able to start or move the car even with the ignition key.) Alternatively, the remote signaling module 31 may be used to activate the system. In particular, the activation button 32 on the remote signaling module 31 may be depressed to transmit an activation signal from transmitter 36 to the receiving means 30 on the master control unit 20. Once the activation signal is transmitted, either via the key pad 24 or the remote signaling module 31, the signal is relayed along the carrying means 60 to each of the solenoid-actuated locking mechanisms 40 and each of the disabling relay switches 50. When the activation signal is received by each of the locking mechanisms 40, each locking mechanism 40 is caused to move into a lock engaging position at its particular component (e.g. steering column, brakes etc.) to prevent that particular component from operating. Similarly, the activation signal causes each of the relay switches 50 to disable the component to which it is connected (e.g. ignition). To this end, the automobile becomes virtually inoperable, making it almost impossible to be driven or towed away. Moreover, with so many critical components secured, it would be futile to attempt to disengage all locking mechanisms 40 and enable all relay switches 50 without the proper security code.

Figure 6:
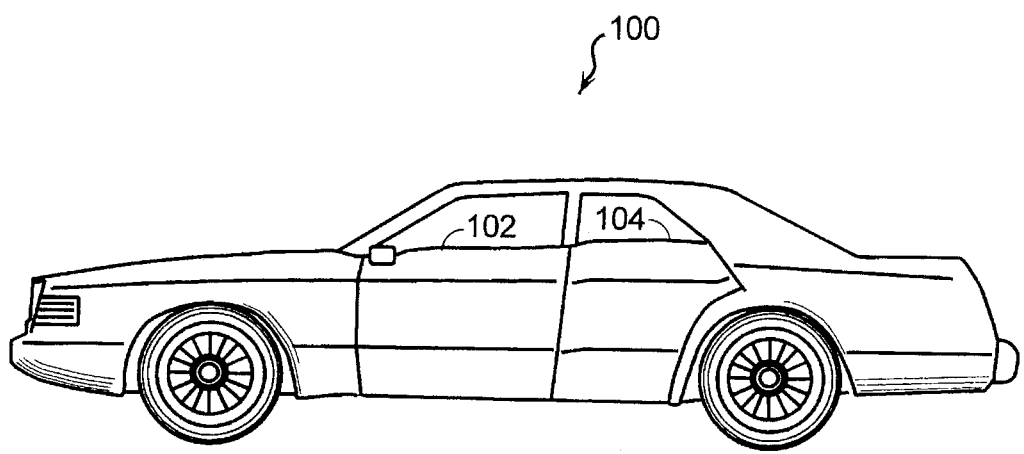
FIG. 6 illustrates motor vehicle installation.

To deactivate the anti-theft system, first the deactivation button 34 on the remote module 31 is depressed once to unlock the driver's door 102 of motor vehicle 100 (see FIG. 6). Neither the passenger doors 104, the solenoid-actuated locking mechanisms 40, nor the disabling relay switches 50 are disengaged with this initial depression. Once inside the motor vehicle, the security code must be entered via the digital key pad 24 on the master control unit 20 to deactivate the system further. Otherwise the anti-theft system will prevent the subsequent unlocking of the passenger doors, the disengagement of the locking mechanisms 40, and the enabling of the relay switch 50 at the ignition to start the motor vehicle. Once the security code has been entered, the deactivation button 34 on the remote module 31 may be depressed for a second time to unlock the passenger doors. (Preferably the deactivation button is depressed twice at this point to distinguish the signal from the initial depression used to open the driver's door to permit entry into the vehicle.) Alternatively, the passenger doors may be unlocked manually by operating the unlock button on the inside of the driver's door. When the passenger doors are unlocked, each solenoid-actuated locking mechanism 40, as well as each relay switch 50, is consequently disengaged from its particular component thereby making the motor vehicle readily operable. The requirement of a second unlock procedure to enable completely the motor vehicle provides an even further level of security should the security code be observed by a prospective thief. After the anti-theft system is deactivated completely and all the car's components are enabled, the car may be started by using the ignition key to turn the ignition switch.

While the invention has been described in connection with specific embodiments thereof, it will be understood that it is capable of further modification. Moreover, this application is intended to cover any variations, uses, or adaptations of the invention following, in general, in principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A method for providing security to a motor vehicle having a passenger door and a driver's door, the method comprising the steps of:

providing a security system having a plurality of solenoid-actuated locking mechanisms for locking engagement with critical components of the motor vehicle, a plurality of relay switches for disabling particular components of the motor vehicle, a master control unit having a digital key pad, a remote signaling module having an activation button for transmitting an activation signal to the master control unit and a deactivation button for transmitting a deactivation signal to the master control unit, and means for relaying the activation and deactivation signals from the master control unit to the plurality of solenoid-actuated locking mechanisms and plurality of relay switches;

remotely transmitting the activation signal to the master control unit by depressing the activation button on the remote signaling module;

relaying the activation signal from the master control across the relaying means to the plurality of solenoid-actuated locking mechanisms and the plurality of relay switches;

urging the solenoid-actuated locking mechanisms into locking engagement with the critical components of the motor vehicle by using the activation signal;

disabling particular components of the motor vehicle by using the activation signal to disengage the relay switches;

remotely transmitting the deactivation signal to the master control unit by depressing the deactivation button once on the remote signaling module;

unlocking the driver's door on the motor vehicle;

operating the digital key pad to enter a security code into the master control unit to deactivate the system; and unlocking the passenger door, disengaging the solenoid-actuated locking mechanisms, and enabling the relay switches by depressing the deactivation button a second time.

2. A method for providing security to a motor vehicle having a passenger door and a driver's door, the method comprising the steps of:

providing a security system having a plurality of solenoid-actuated locking mechanisms for locking engagement with critical components of the motor vehicle, a plurality of relay switches for disabling particular components of the motor vehicle, a master control unit having a digital key pad, a remote signaling module having an activation button for transmitting an activation signal to the master control unit and a deactivation button for transmitting a deactivation signal to the master control unit, and means for relaying the activation and deactivation signals from the master control unit to the plurality of solenoid-actuated locking mechanisms and plurality of relay switches;

operating the digital key pad on the master control unit to enter a security code to provide an activation signal;

relaying the activation signal from the master control across the relaying means to the plurality of solenoid-actuated locking mechanisms and the plurality of relay switches;

urging the solenoid-actuated locking mechanisms into locking engagement with the critical components of the motor vehicle by using the activation signal:

disabling particular components of the motor vehicle by using the activation signal to disengage the relay switches;

remotely transmitting the deactivation signal to the master control unit by depressing the deactivation button once on the remote signaling module;

unlocking the driver's door on the motor vehicle; operating the digital key pad to enter a security code into the master control unit to deactivate the system; and unlocking the passenger door, disengaging the solenoid-actuated locking mechanisms, and enabling the relay switches by depressing the deactivation button a second time.

* * * * *